United States Patent [19]

Beall et al.

[11] Patent Number: 5,071,795
[45] Date of Patent: Dec. 10, 1991

[54] ALKALI ZINC HALOPHOSPHATE GLASSES

[75] Inventors: George H. Beall, Big Flats; Candace J. Quinn, Corning, both of N.Y.

[73] Assignee: Corning Incorporated, Corning, N.Y.

[21] Appl. No.: 639,100

[22] Filed: Jan. 9, 1991

[51] Int. Cl.$^5$ .................... C03C 3/247; C03C 3/16; C03C 3/17; C03C 3/062

[52] U.S. Cl. ........................... 501/44; 501/45; 501/48; 501/73

[58] Field of Search .............. 501/44, 45, 48, 73

[56] References Cited

U.S. PATENT DOCUMENTS

| | | | |
|---|---|---|---|
| 3,869,404 | 3/1975 | Shaw et al. | 501/43 |
| 4,226,628 | 10/1980 | Bartholomew et al. | 501/43 |
| 4,940,677 | 7/1990 | Beall et al. | 501/45 |
| 4,996,172 | 2/1991 | Beall et al. | 501/45 |

Primary Examiner—Mark L. Bell
Attorney, Agent, or Firm—C. S. Janes, Jr.

[57] ABSTRACT

This invention is directed to the production of glasses demonstrating working temperatures below about 450° C., transition temperatures no higher than about 350° C., and good resistance to attack by mild aqueous alkaline solutions consisting essentially, expressed in terms of mole percent on the oxide basis of

| | | | |
|---|---|---|---|
| $Li_2O$ | 0–25 | ZnO | 25–50 |
| $Na_2O$ | 5–20 | $Al_2O_3$ | 0–3 |
| $K_2O$ | 0–12 | $P_2O_5$ | 25–37 |
| $Li_2O + Na_2O + K_2O$ | 15–35 | SnO | 0–10 | to which are included 0.5–8% Cl and 0–5 % F. as analyzed in weight percent.

3 Claims, No Drawings

ALKALI ZINC HALOPHOSPHATE GLASSES

BACKGROUND OF THE INVENTION

U.S. Pat. No. 4,940,677 (Beall et al.) discusses in some detail the extensive research which has been undertaken to devise inorganic glass compositions exhibiting low transformation or transition temperatures (Tg), that characteristic enabling glass batch melting and melt forming operations to be carried out at low temperatures. As was explained there, glasses demonstrating low transition temperatures were known in the glass art, one such family of glasses comprising phosphate-based compositions. Nevertheless, as was also noted there, the chemical durability of phosphate-based glasses was customarily less than that of silicate-based glasses, the durability becoming poorer as the transition temperature of the glass was reduced.

Hence, the primary objective of that patent was to develop glass compositions not only exhibiting a transition temperature below 450° C. and a working temperature below 500° C., but also demonstrating good resistance to attack by water and mild aqueous alkaline solutions. The glasses disclosed consisted essentially, expressed in terms of mole percent on the oxide basis, of at least 65% total of

| | | | |
|---|---|---|---|
| ZnO | 23-55 | $Na_2O$ | 0-25 |
| $P_2O_5$ | 28-40 | $K_2O$ | 0-25 |
| $Li_2O$ | 0-25 | $Li_2O + Na_2O + K_2O$ | 10-35 | and up to 35% total of

| | | | |
|---|---|---|---|
| $Al_2O_3$ | 0-6 | $ZrO_2$ | 0-5 |
| $B_2O_3$ | 0-8 | $SiO_2$ | 0-4 |
| $Al_2O_3 + B_2O_3$ | 0-8 | MgO | 0-10 |
| $Cu_2O$ | 0-15 | CaO | 0-10 |
| F | 0-5 | SrO | 0-10 |
| PbO | 0-35 | BaO | 0-12 |
| SnO | 0-35 | MnO | 0-10 |
| PbO + SnO | 0-35 | MgO + CaO + SrO + BaO + MnO | 0-15. |

Whereas those glasses did indeed manifest excellent chemical durability, considering the fact that the transition temperatures thereof were below 450° C., research continued to develop glasses having equally low transition temperatures, but wherein the resistance thereof to attack by water and mild aqueous alkaline solutions would be yet improved. That research resulted in U.S. application Ser. No. 07/372,764, filed June 29, 1989 by G. H. Beall et al. under the title RARE EARTH-CONTAINING ZINC PHOSPHATE GLASSES. The glasses described in that application demonstrated working temperatures below 450° C., preferably between 350°-450° C., and resistance to attack by mild aqueous alkaline solutions at least ten times superior to that exhibited by the glasses of U.S. Pat. No. 4,940,677. Those glasses consisted essentially, expressed in terms of mole percent on the oxide basis, of

| | | | |
|---|---|---|---|
| $Li_2O$ | 0-25 | $P_2O_5$ | 28-45 |
| $Na_2O$ | 0-25 | $Al_2O_3$ | 0-4 |
| $K_2O$ | 0-25 | SnO | 0-35 |
| $Li_2O + Na_2O + K_2O$ | 10-35 | PbO | 0-35 |
| ZnO | 30-55 | SnO + PbO | 0-35 |

$Y_2O_3$ and/or at least one rare earth metal oxide 0.5-5 wherein at least two alkali metal oxides are present.

U.S. Pat. application Ser. No. 07/403,655, filed Sept. 11, 1989 by W. A. Bahn et al. under the title GLASS/-GLASS-CERAMIC-PLASTIC ALLOY ARTICLES, describes the preparation of alloys or blends consisting essentially of a glass and/or glass-ceramic and an organic thermoplastic or thermosetting polymer having a working temperature compatible with that of the glass and/or the precursor glass for the glass-ceramic. In forming such alloys or blends, the glass and polymer are combined at the working temperature of the glass to form an intimate mixture. That is, the glass and polymer are in a sufficiently fluid state to permit mixing together to an essentially homogeneous state such that, upon cooling, the resulting body exhibits an essentially uniform, fine-grained microstructure wherein, desirably, there is at least partial miscibility and/or a reaction between the glass and the polymer to provide adhesion and bonding therebetween. The articles produced from that combination of glass and organic polymer demonstrate a unique set of physical properties. For example, at high loadings of glass, i.e., greater than 50% by volume, the articles exhibit high stiffness, high hardness and abrasion resistance, and good mechanical strength imparted by the glass component, coupled with light weight and good toughness and impact resistance imparted by the polymer. The glasses disclosed in U.S. Pat. No. 4,940,677 and U.S. application Ser. No. 07/403,655 have been utilized as the glass component of such alloys.

As was observed above, phosphate-based glass compositions customarily display poorer chemical durability and resistance to attack by moisture than silicate-based glass compositions, and those liabilities become ever more pronounced as the glasses are compounded to demonstrate lower transition temperatures. Therefore, whereas composite bodies composed of organic polymers reinforced through the entrainment of silicate glass fibers and/or particles have long been marketed commerically, glass/plastic composites utilizing phosphate-based glasses have not been marketed to any substantial extent. Thus, although the glass/plastic composite articles known to the art are not porous in a physical sense, the organic polymers are permeable to water; i.e., they are sufficiently permeable to allow water to migrate into the article to thereby come into contact with the glass component. Inasmuch as the glass flakes, fibers, powder, and the like providing the reinforcement for the plastic body present a very high surface area to the incoming moisture, degradation thereof proceeds relatively rapidly. As can be appreciated, that condition becomes more extensive as the proportion of glass in the composite increases and the particle size thereof decreases. Yet, to produce articles exhibiting the stiffness, hardness, abrasion resistance, and mechanical strength imparted thereto through the presence of glass, the glass component must necessarily constitute the greater proportion thereof.

In an effort to broaden the field of organic polymers suitable for forming alloys of the type described in U.S. application Ser. No. 07/403,655,i.e., polymers having lower temperature capabilities and which are customarily less costly, research was conducted to devise glass compositions highly resistant to attack by moisture with working temperatures below about 425° C., preferably no higher than about 400° C., and with transition temperatures no higher than about 350° C., preferably no higher than 325° C.

SUMMARY OF THE INVENTION

Glasses exhibiting those properties have been prepared from compositions within the alkali metal zinc halophosphate system. Those glasses have base compositions consisting essentially, expressed in terms of mole percent on the oxide basis, of 15–35% $R_2O$, wherein $R_2O$ consists of 0–25% $Li_2O$, 5–20% $Na_2O$, and 0–12% $K_2O$, 25–50% ZnO, 0–10% SnO, 0–3% $Al_2O_3$, and 25–37% $P_2O_5$, to which are included 0.5–8% Cl and 0–5% F, as analyzed in weight percent. The sum of $R_2O + ZnO + SnO + Al_2O_3 + P_2O_5$ will constitute at least 90 mole % of the total oxide composition. The chloride additions to the base glass compositions produced two highly significant effects; viz., the glass transition temperature was lowered substantially, and the glass stability was improved. The addition of fluoride in combination with chloride appears to be beneficial in lowering the transition temperature of the glass. However, the loss of fluoride during melting of the glass batch is considerably greater than the loss of chloride through volatilization from the melt. As a result of the addition of chloride with, optionally, fluoride, glass bodies could be formed at temperatures below 400° C, while exhibiting excellent resistance to attack by moisture and mild aqueous alkaline solutions such as dishwasher detergents.

Previous research had indicated that $ZnCl_2$ is a glass forming compound; i.e., zinc in tetrahedral coordination with chloride can assume a random structure. Through that discovery the glass enhancing properties of chloride in zinc phosphate-based glasses can be understood.

Additions of copper to the inventive glasses in amounts up to 10% $Cu_2O$ yielded a turquoise-colored opal glass containing fine-grained crystallities which were identified as CuCl via X-ray diffraction analyses. These crystallites are believed to have raised the apparent glass transition temperature. Certain of those opal glasses displayed hydrophobic behavior at room temperature; that is, high angle beads of water were observed rolling on the surface.

Additions of up to 8 mole % total of alkaline earth metal oxides (MgO, CaO, SrO, BaO) may be included to modify the viscosity characteristics of the glass, as may up to 3 mole % $SiO_2$.

Whereas an exact conversion of mole percent to weight percent is not mathematically possible, the following values approximate the above oxide ranges in weight percent: 10–20% $R_2O$, wherein $R_2O$ consists of 0–5% $Li_2O$, 2–12% $Na_2O$, and 0–10% $K_2O$, 20–42% ZnO, 0–15% SnO, 0–3% $Al_2O_3$, and 37–50% $P_2O_5$.

PRIOR LITERATURE

U.S. Pat. No. 3,930,833 (Roberts) describes the preparation of micronutrient-containing, water-leachable glasses consisting essentially, in weight percent, of 5–20% NaCl and/or KCl and/or $Na_2O$ and/or $K_2O$, 30–60% ZnO, and 25–65% $P_2O_5$. No reference is made to the concentration, if any, of chloride in the final glass. In the working examples of the patent, the levels of ZnO were greater than those of $P_2O_5$. In the glasses of the present invention, the amounts of $P_2O_5$ in weight percent are typically greater than those of ZnO. Finally, and most critically, waterleachable glasses were desired in the patent. In contrast, the glasses of the instant invention demonstrate excellent resistance to moisture. Therefore, the glasses of the patent would not be useful in the present invention.

U.S. Pat. No. 4,226,628 (Bartholomew et al.) discloses the preparation of cuprous copper and/or silver halide-phosphate glasses which exhibit electrochromic behavior and may also manifest thermochromic properties. The levels of copper required in the patent far exceed those that can be tolerated in the present invention. ZnO is merely an optional component and was included in only one working example, the amount recorded there being considerably less than the minimum demanded in the present invention.

In INFRARED ABSORPTION AND STRUCTURE OF CHLOROPHOSPHATE GLASSES, *Journal of Non-Crystalline Solids,* 40, 535-548 (1980), Almeida and Mackenzie describe glasses in the $NaPO_3$-$ZnCl_2$ system exhibiting transition temperatures ranging between 83°–279° C. The $Na_2O$ contents of the glasses varied from 28.75–50 mole percent and the glasses were hygroscopic, thereby rendering them unsuitable in the present invention.

DESCRIPTION OF PREFERRED EMBODIMENTS

Table I records a group of glass compositions expressed in terms of mole percent on the oxide basis, except for the halide-containing components which are listed in terms of the actual batch ingredient employed. Table IA reports the same glasses wherein the compositions have been converted to weight percent. The halides are reported both in terms of the amount added in the batch materials and as analyzed in the final glass (B halide, A halide).

The actual batch ingredients for the constituents tabulated in terms of oxides can comprise any materials, either the oxides or other compounds, which, upon being melted together, will be transformed into the desired oxide in the proper proportions. To illustrate, $Li_2CO_3$ is conveniently employed as the source of $Li_2O$.

The batch materials were compounded, thoroughly mixed together through ballmilling to assist in obtaining a homogeneous melt, and then charged into silica crucibles. After placing lids thereon, the crucibles were introduced into a furnace operating at about 800°–1000° C. and held at that temperature for about 2-4 hours. Each melt was poured into a steel mold to form a rectangular glass slab having dimensions of about $8'' \times 4'' \times 0.5''$, and that glass slab was transferred immediately to an annealer operating at a temperature of about 250° C.

Rectangular tab-shaped pieces weighing about 30–40 grams were cut from the annealed slabs and heated in cups shaped from aluminum foil at temperatures within the range of about 300°–400° C. Glass cane was hand-drawn from each cup to gain a close approximation of the working temperature of the glass.

Although the preceding description reflects laboratory melting and forming only, it must be recognized that the inventive glasses are capable of being melted in large scale melting units and shaped into articles of desired configurations using techniques conventional in the glass-making art. Consequently, in accordance with standard glassmaking practice, it is only necessary that the batch materials be mixed together thoroughly, the batch then melted at temperatures assuring a homogenous melt without excessive volatilization of chloride (and fluoride, if present), that melt thereafter cooled and simultaneously shaped into a glass body of a desired geometry, and that shape will customarily be annealed.

TABLE I (Mole %)

|  | 1 | 2 | 3 | 4 | 5 | 6 | 7 | 8 |
|---|---|---|---|---|---|---|---|---|
| $P_2O_5$ | 33 | 33 | 33 | 33 | 33 | 33 | 30 | 33 |
| $Al_2O_3$ | 2 | 2 | 2 | 2 | 2 | 2 | 2 | 2 |
| $Li_2O$ | 7 | — | 6 | — | — | — | — | — |
| $Na_2O$ | 8 | 8 | 13 | 13 | — | 10 | 6 | 13 |
| $K_2O$ | 5 | — | 5 | — | — | — | — | — |
| $Li_2Cl_2$ | — | 7 | — | 6 | 6 | 6 | 6 | 6 |
| $K_2Cl_2$ | — | 5 | — | 5 | 5 | 5 | 6 | 6 |
| $Na_2Cl_2$ | — | — | — | — | 13 | — | — | — |
| ZnO | 45 | 45 | 41 | 41 | 41 | 42 | 44 | 35 |
| $Cu_2O$ | — | — | — | — | — | — | 6 | — |
| $SiO_2$ | — | — | — | — | — | 2 | — | — |
| CaO | — | — | — | — | — | — | — | 3 |
| BaO | — | — | — | — | — | — | — | 2 |

|  | 9 | 10 | 11 | 12 | 13 |
|---|---|---|---|---|---|
| $P_2O_5$ | 31.8 | 31.6 | 29.1 | 30.1 | 31.6 |
| $Al_2O_3$ | 1.9 | 1.9 | 1.9 | 1.9 | 1.9 |
| $Na_2O$ | 11.5 | 13.5 | 9.7 | 5.5 | 13.5 |
| $Li_2F_2$ | 9.4 | 11.0 | 7.8 | 18.3 | 10.4 |
| $K_2Cl_2$ | 5.8 | 6.7 | 4.9 | 5.6 | 6.7 |
| ZnO | 39.6 | 35.4 | 46.6 | 38.2 | 30.6 |
| SnO | — | — | — | — | 4.8 |

TABLE IA

|  | 1 | 2 | 3 | 4 | 5 | 6 | 7 | 8 |
|---|---|---|---|---|---|---|---|---|
| $P_2O_5$ | 48.2 | 45.1 | 48.4 | 45.5 | 42.6 | 39.9 | 45.5 | 44.6 |
| $Al_2O_3$ | 2.1 | 1.9 | 2.1 | 1.9 | 1.8 | 1.9 | 1.9 | 1.9 |
| $Li_2O$ | 2.2 | — | 1.9 | — | — | — | — | — |
| $Na_2O$ | 5.1 | 4.8 | 8.4 | 7.9 | — | 3.5 | 6.0 | 7.7 |
| $K_2O$ | 4.8 | — | 4.9 | — | — | — | — | — |
| LiCl | — | 5.7 | — | 5.0 | 4.6 | 4.8 | 4.9 | 4.8 |
| KCl | — | 7.2 | — | 7.3 | 6.8 | 8.3 | 7.3 | 8.5 |
| NaCl | — | — | — | — | 13.7 | — | — | — |
| ZnO | 37.6 | 35.2 | 34.5 | 32.4 | 30.4 | 33.6 | 33.2 | 27.1 |
| $Cu_2O$ | — | — | — | — | — | 8.1 | — | — |
| $SiO_2$ | — | — | — | — | — | — | 1.2 | — |
| CaO | — | — | — | — | — | — | — | 1.0 |
| BaO | — | — | — | — | — | — | — | 4.4 |
| BCl | — | 8.1 | — | 7.6 | 15.3 | 7.9 | 7.5 | 8.0 |
| ACl | <0.1* | 1.63 | <0.1* | 3.60 | 4.27 | NA** | NA** | 3.53 |

|  | 9 | 10 | 11 | 12 | 13 |
|---|---|---|---|---|---|
| $P_2O_5$ | 45.2 | 45.1 | 41.9 | 44.6 | 44.0 |
| $Al_2O_3$ | 1.9 | 1.9 | 2.0 | 1.9 | 1.9 |
| $Na_2O$ | 7.1 | 8.4 | 6.1 | 3.5 | 8.2 |
| LiF | 4.9 | 5.7 | 4.1 | 9.7 | 5.5 |
| KCl | 8.6 | 10.0 | 7.4 | 8.5 | 9.8 |
| ZnO | 32.2 | 28.9 | 38.5 | 31.8 | 24.4 |
| SnO | — | — | — | — | 6.3 |
| BCl | 4.1 | 4.8 | 3.5 | 4.0 | 4.7 |
| ACl | 2.6 | 3.6 | 2.1 | 3.7 | 3.6 |
| BF | 3.6 | 4.2 | 3.0 | 7.1 | 4.0 |
| AF | 1.5 | 2.0 | 1.2 | 1.5 | NA** |

*Impurity from batch materials
**Not analyzed

Rectangular samples having the approximate dimensions of 40×25×15 mm were cut from each annealed glass slab and thereafter ground and polished for testing the chemical durability thereof. Because one application contemplated for the inventive glass was their utility in the manufacture of ovenware, the resistance of the glasses to attack by mild aqueous alkaline solutions, such as would be encountered in dishwasher detergents, was considered to be vital. Therefore, the surface area of each sample was measured carefully, the sample weighed, and then immersed into a bath operating at 95° C. of a 0.3% by weight aqueous solution of a detergent marketed by Economic Laboratories, St. Paul, Minnesota, under the trade name SUPER SOILAX, the solution exhibiting a pH of about 10. After a period of 24 hours, the sample was withdrawn from the batch, rinsed in tap water, dried in the ambient environment, and reweighed to determine any loss of weight. The weight loss per unit area was subsequently calculated and expressed in terms of $mg/cm^2$.

Other samples of similar size were immersed into a bath of boiling deionized water. After an immersion of six hours, each sample was removed from the water bath, dried in the ambient atmosphere, and reweighed to determine any weight loss.

Table II records the weight loss determined in the SUPER SOILAX detergent test (SUPER), the weight loss determined in the boiling water test (WATER), the Tg of the glass reported in terms of °C., as measured employing standard differential scanning calorimetry techniques, and the working temperature of the glass expressed in terms of °C., as estimated in the above described cane pulling procedure (PULL).

TABLE II

|  | 1 | 2 | 3 | 4 | 5 | 6 | 7 | 8 |
|---|---|---|---|---|---|---|---|---|
| SUPER | 2.39 | 1.27 | 1.81 | 1.66 | 1.69 | 1.13 | 2.48 | — |
| WATER | 0.00 | 0.00 | 0.00 | 0.00 | 0.00 | 0.03 | — | 0.00 |
| Tg | 345 | 323 | 334 | 309 | 313 | 343 | 316 | — |
| PULL | 425 | 400 | 400 | 375 | 375 | 400 | 380 | 400 |

|  | 9 | 10 | 11 | 12 | 13 |
|---|---|---|---|---|---|
| SUPER | — | — | — | — | — |
| WATER | 0.04 | 0.13 | 0.00 | 0.00 | 0.07 |
| Tg | 275 | 257 | 296 | 275 | 254 |
| PULL | 380 | 350 | 400 | 360 | 350 |

A comparison of Example 1 with Example 2 and a comparison of Example 3 with Example 4 illustrate the improvements in resistance to attack by alkalies imparted through the presence of chloride, plus the lowering in Tg and working temperature resulting therefrom. The favorable effect of fluoride in further lowering the Tg is shown in Examples 9-13.

To assure glasses exhibiting working temperatures no higher than about 400° C., transition temperatures below about 350° C., and good chemical durability, the preferred oxide compositions consist essentially, expressed in terms of mole percent on the oxide basis, of 10-25% $R_2O$, wherein $R_2O$ consists of 0-8% $Li_2O$, 8-15% $Na_2O$, and 0-8% $K_2O$, 30-50% ZnO, 1-3% $Al_2O_3$, and 27-35% $P_2O_5$, to which is included 1-6% Cl, as analyzed in weight %, the sum of $R_2O+ZnO+Al_2O_3+P_2O_5$ constituting at least 95 mole percent of the total composition.

In light of its overall combination of properties, Example 12 is deemed to be the most preferred embodiment of the inventive glasses.

We claim:

1. A glass exhibiting a working temperature below about 425° C., a transition temperature no higher than about 350° C., and good resistance to attack by mild aqueous alkaline solutions consisting essentially, expressed in terms of mole percent on the oxide basis, of 15-35% $R_2O$, wherein $R_2O$ consists of 0-25% $Li_2O$, 5-20% $Na_2O$, and 0-12% $K_2O$, 25-50% ZnO, 0-10% SnO, 0-3% $Al_2O_3$, and 25-37% $P_2O_5$, to which are included 0.5-8% Cl and 0-5% F, as analyzed in weight percent, the sum of $R_2O+ZnO+SnO+Al_2O_3+P_2O_5$ constituting at least 90 mole percent of the total composition.

2. A glass according to claim 1 also containing up to 3% $SiO_2$, up to 8% total of at least one alkaline earth metal oxide selected from the group consisting of MgO, CaO, SrO, and BaO, and up to 10% $Cu_2O$.

3. A glass according to claim 1 exhibiting a working temperature no higher than about 400° C., a transition temperature below 350° C., and good resistance to attack by mild aqueous alkaline solutions consisting essentially, expressed in terms of mole percent on the oxide basis, of 10-25% $R_2O$, wherein $R_2O$ consists of 0-8% $Li_2O$, 8-15% $Na_2O$, and 0-8% $K_2O$, 30-50% ZnO, 1-3% $Al_2O_3$, and 27-35% $P_2O_5$ to which is included 1-6% Cl, as analyzed in weight percent, the sum of $R_2O+ZnO+Al_2O_3+P_2O_5$ constituting at least 95 mole percent of the total composition.

* * * * *

UNITED STATES PATENT AND TRADEMARK OFFICE
CERTIFICATE OF CORRECTION

PATENT NO. : 5,071,795
DATED : December 10, 1991
INVENTOR(S) : George H. Beall and Candace J. Quinn It is certified that error appears in the above-identified patent and that said Letters Patent is hereby corrected as shown below:

In column 5, Table IA, the following columns and lines should be reversed to read as follows:

|     | 9   | 10  | 11  | 12  | 13  |
|-----|-----|-----|-----|-----|-----|
| AC1 | 3.6 | 4.2 | 3.0 | 7.1 | 4.0 |
| BF  | 2.6 | 3.6 | 2.1 | 3.7 | 3.6 |

Signed and Sealed this

Thirty-first Day of August, 1993

Attest:

BRUCE LEHMAN

*Attesting Officer*     *Commissioner of Patents and Trademarks*